United States Patent
Kumar et al.

(10) Patent No.: US 10,671,402 B2
(45) Date of Patent: Jun. 2, 2020

(54) SHADOW CHANNEL MESSAGE BROADCASTING

(71) Applicant: Freshworks Inc., San Bruno, CA (US)

(72) Inventors: Navneet Kumar, Chennai (IN);
Shahabudeen Sajith, Chennai (IN);
Vikram Chaitanya, Chennai (IN);
Nisha Oarath, Palakkad (IN)

( * ) Notice: Subject to any disclaimer, the term of this patent is extended or adjusted under 35 U.S.C. 154(b) by 190 days.

(21) Appl. No.: 15/710,625

(22) Filed: Sep. 20, 2017

(65) Prior Publication Data

US 2018/0357063 A1 Dec. 13, 2018

(30) Foreign Application Priority Data

Jun. 10, 2017 (IN) .............................. 201741020361

(51) Int. Cl.
*G06F 9/38* (2018.01)
*H04L 12/18* (2006.01)
*H04L 12/58* (2006.01)

(52) U.S. Cl.
CPC ........ *G06F 9/3863* (2013.01); *H04L 12/1859* (2013.01); *H04L 12/1895* (2013.01); *H04L 51/04* (2013.01); *H04L 51/12* (2013.01)

(58) Field of Classification Search
CPC ... G06F 9/3863; H04L 12/1859; H04L 51/04; H04L 51/12
See application file for complete search history.

(56) References Cited

U.S. PATENT DOCUMENTS

2008/0280606 A1* 11/2008 Tayloe .................... H04L 1/001
455/435.1
2016/0316038 A1* 10/2016 Jolfaei ................ H04L 67/2842

* cited by examiner

*Primary Examiner* — Nasser M Goodarzi
*Assistant Examiner* — Adil Ocak
(74) *Attorney, Agent, or Firm* — LeonardPatel PC

(57) ABSTRACT

A method for notifying a subset of users of a messaging channel may include publishing one or more shadow channels for the messaging channel. Each shadow channel is configured to prevent transmission of an event notification to one or more unregistered user devices. The method may also include broadcasting one or more event notifications to one or more registered user devices when an event associated with the one or more shadow channels is triggered. The one or more registered user devices are subscribers to the one or more shadow channels.

16 Claims, 7 Drawing Sheets

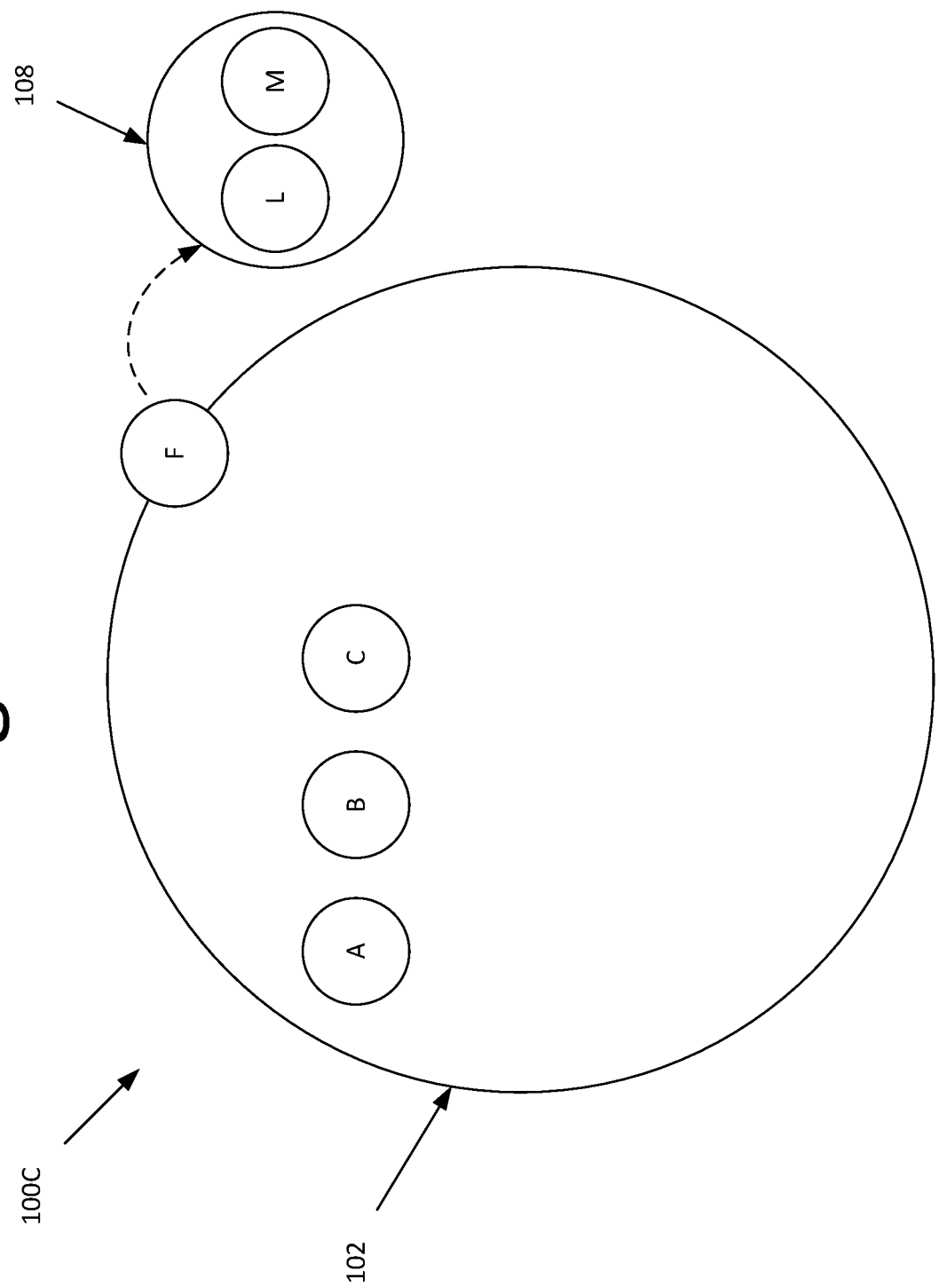

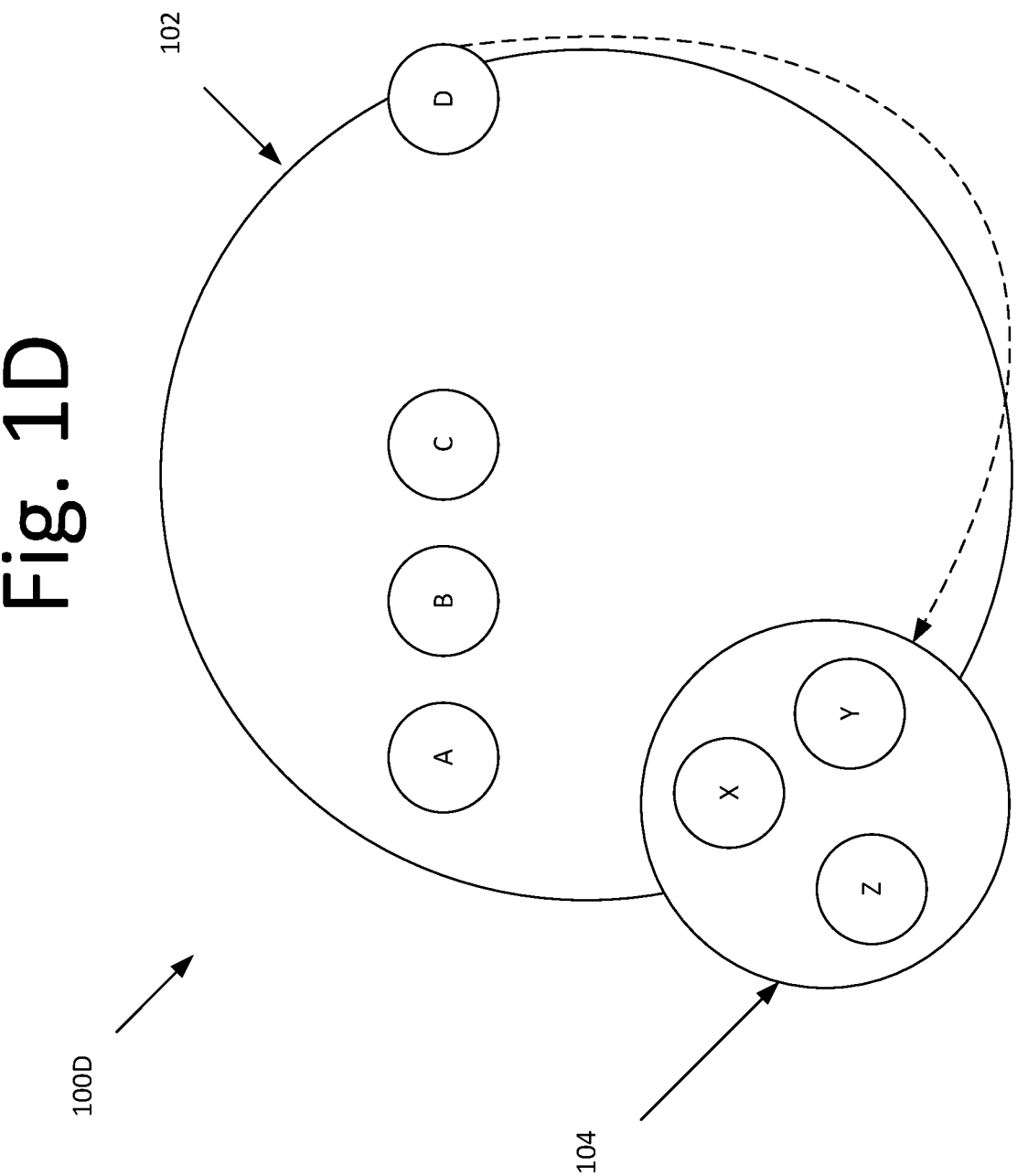

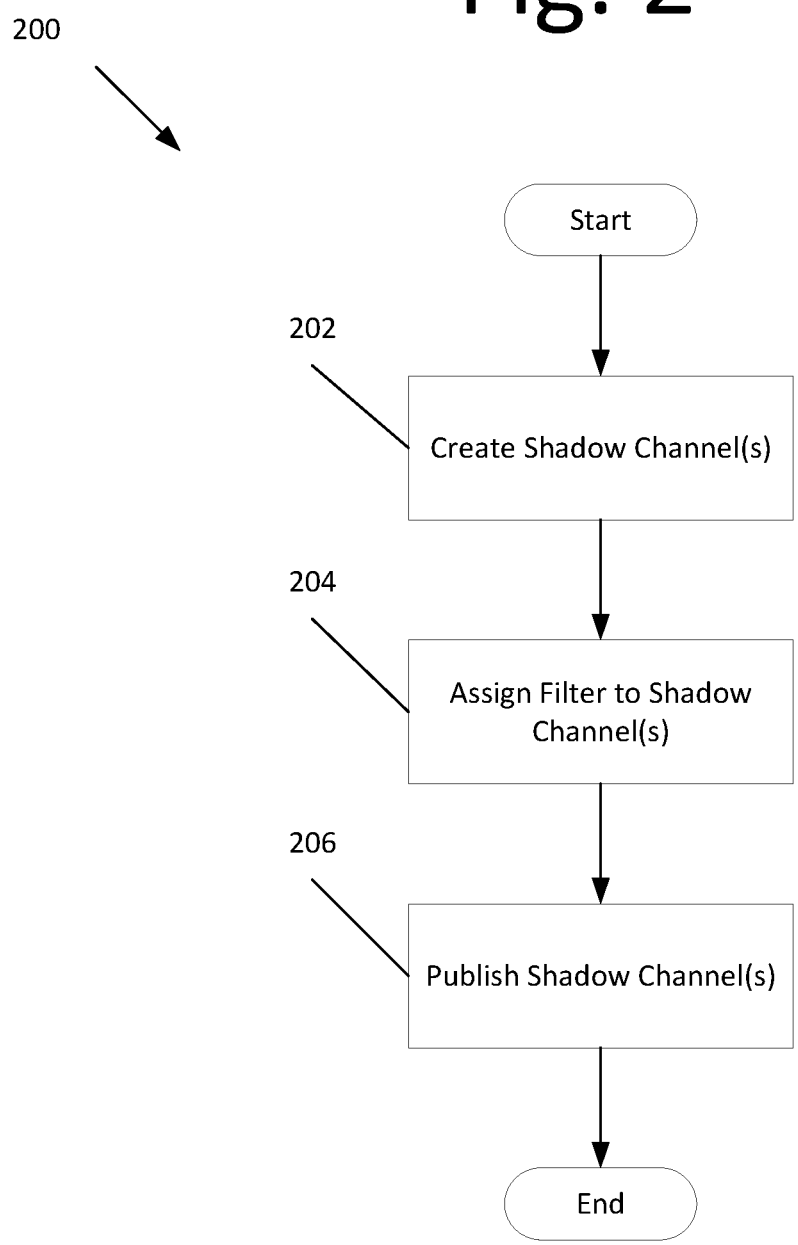

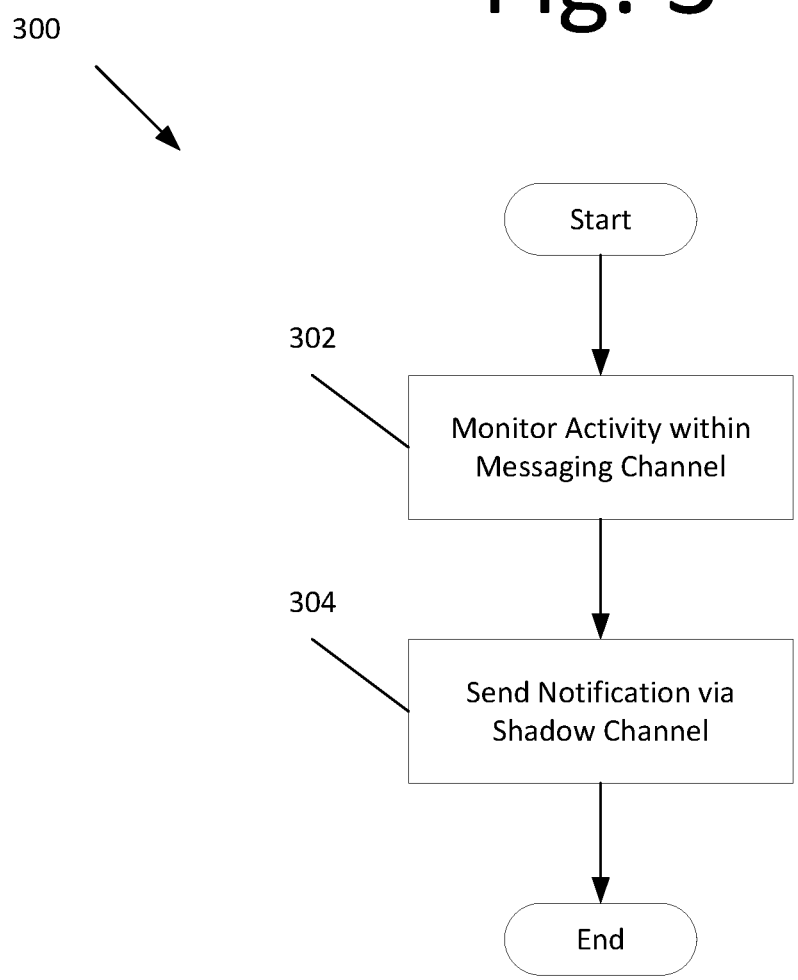

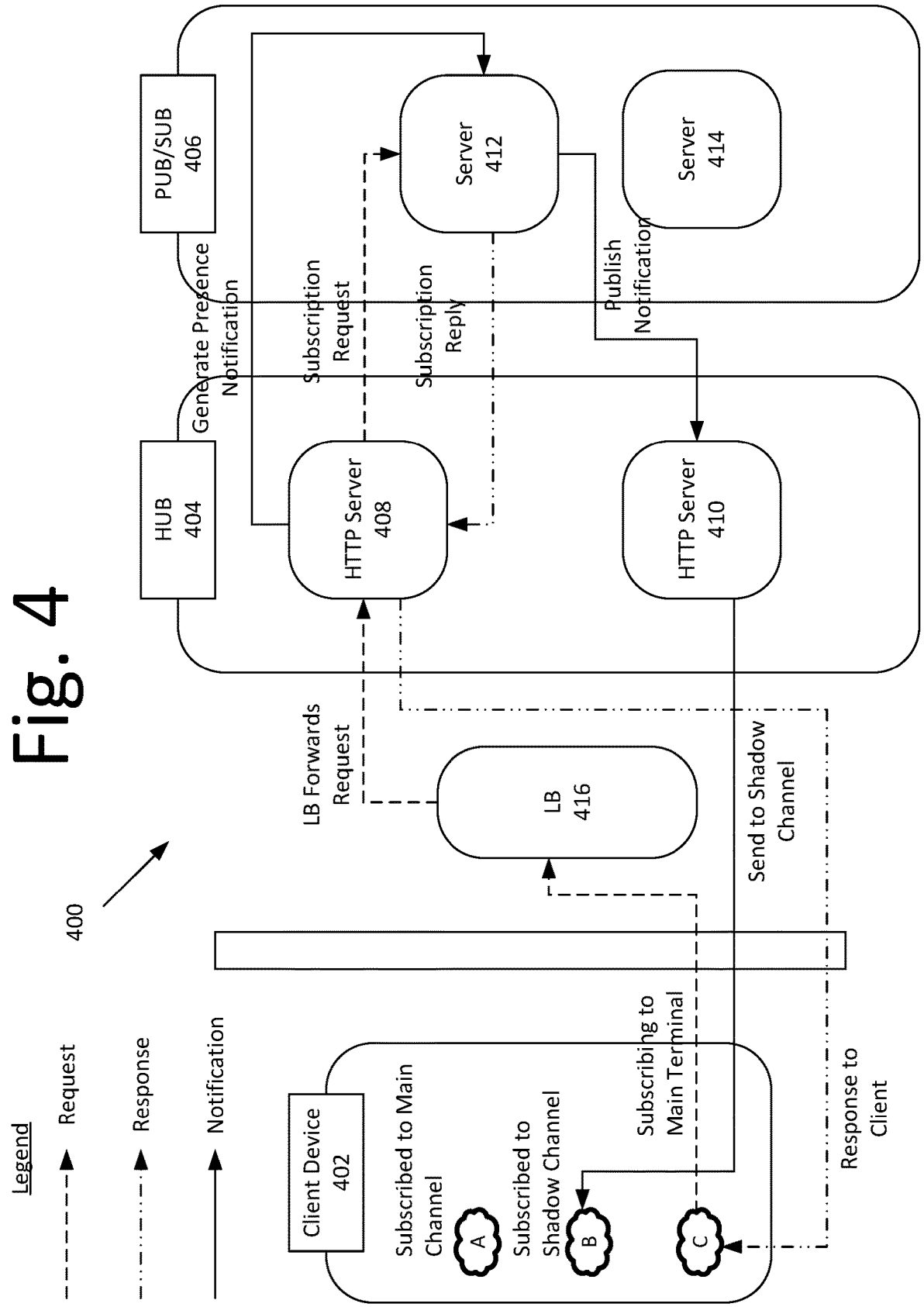

SHADOW CHANNEL MESSAGE BROADCASTING

CROSS-REFERENCE TO RELATED APPLICATION

This application claims priority to, and claims the benefit of, Indian Patent Application No. 201741020361, filed on Jun. 10, 2017. The subject matter thereof is hereby incorporated herein by reference in its entirety.

FIELD

The present invention relates to messaging, and more particularly, to creating one or more shadow channels for one or more messaging channels for messaging purposes.

BACKGROUND

When users, such as agents and customers, are associated with a messaging channel(s), the users receive notifications when an event or a condition is triggered. For example, every time a user joins or leaves the messaging channel, all users associated with the messaging channel receive a notification. This is particularly useful from a notification standpoint.

However, at any given moment, the group size may become large (e.g., over 1,000 users). With such a group size, the number of notifications that is sent is large. Also, the notifications are conventionally sent to all users, even uninterested users. This problem becomes an N-squared problem, and as the square of the group size increases, the problems associated therewith also increase. For example, the increase in the number of notifications being sent may result in slowing the overall architecture of the messaging system.

Further, because the notifications are consumed by a small subset of users of a group, the users not consuming the notifications generally discard them. Thus, an improved message broadcasting system may be beneficial.

SUMMARY

Certain embodiments of the present invention may provide solutions to the problems and needs in the art that have not yet been fully identified, appreciated, or solved by current messaging or notification systems. For example, some embodiments of the present invention generally pertain to a system and architecture that notifies one or more users of a messaging channel by way of one or more shadow channels. The shadow channels may correspond to the messaging channel, and may be used to broadcast notifications to interested users, filtering out unwanted notifications.

In an embodiment, a method for notifying a subset of users of a messaging channel includes publishing one or more shadow channels for the messaging channel. Each of the one or more shadow channels is configured to prevent transmission of an event notification to one or more unregistered user devices. The method also includes broadcasting one or more event notifications to one or more registered user devices when an event associated with the one or more shadow channels is triggered. The one or more registered user devices are subscribers to the one or more shadow channels.

In another embodiment, a system for broadcasting event notifications to interested users includes at least one server and a plurality of subscribed user devices. The at least one server is configured to establish a messaging channel including a plurality of shadow channels. Each of the plurality of shadow channels corresponds to a predefined activity within the messaging channel. When the predefined activity occurs within one of the plurality of shadow channels, the at least one server, via one of the plurality of shadow channels, is configured to broadcast an event notification to one or more of the subscribed user devices, eliminating event notification transmission to user devices that are not part of the shadow channel.

In yet another embodiment, a method for notifying a subset of users of a messaging channel may include publishing one or more shadow channels for the messaging channel. Each shadow channel is configured to prevent transmission of an event notification to one or more unregistered user devices. The method may also include broadcasting one or more event notifications to one or more registered user devices when an event associated with the one or more shadow channels is triggered. The one or more registered user devices are subscribers to the one or more shadow channels In another embodiment, a computer program may be embodied on a non-transitory computer-readable medium. The computer program when executed by at least one processor may cause an apparatus to publish one or more shadow channels for the messaging channel. Each of the one or more shadow channels is configured to prevent transmission of an event notification to one or more unregistered user devices. The computer program may also cause the apparatus to broadcast one or more event notifications to one or more registered user devices when an event associated with the one or more shadow channels is triggered. The one or more registered user devices are subscribers to the one or more shadow channels.

In yet another embodiment, a system for broadcasting event notifications to interested users may include at least one server and a plurality of subscribed user devices. The at least one server is configured to establish a messaging channel comprising a plurality of shadow channels. Each plurality of shadow channels may correspond to a predefined activity within the messaging channel. When the predefined activity occurs within one of the plurality of shadow channels, the at least one server, via one of the plurality of shadow channels, is configured to broadcast an event notification to one or more of the subscribed user devices, eliminating event notification transmission to user devices that are not part of the shadow channel.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1C is a set diagram illustrating a subset outside of the larger superset (or messaging channel), according to an embodiment of the present invention.

FIG. 1D is a set diagram illustrating a subset outside of the larger superset (or messaging channel), according to an embodiment of the present invention.

FIG. 2 is a flow diagram illustrating a process for creating a shadow channel, according to an embodiment of the present invention.

FIG. 3 is a flow diagram illustrating a process for notifying users who are subscribed to a shadow channel, according to an embodiment of the present invention.

FIG. 4 is a diagram illustrating a system architecture for a shadow channel, according to an embodiment of the present invention.

DETAILED DESCRIPTION OF THE EMBODIMENTS

Figure 1A:
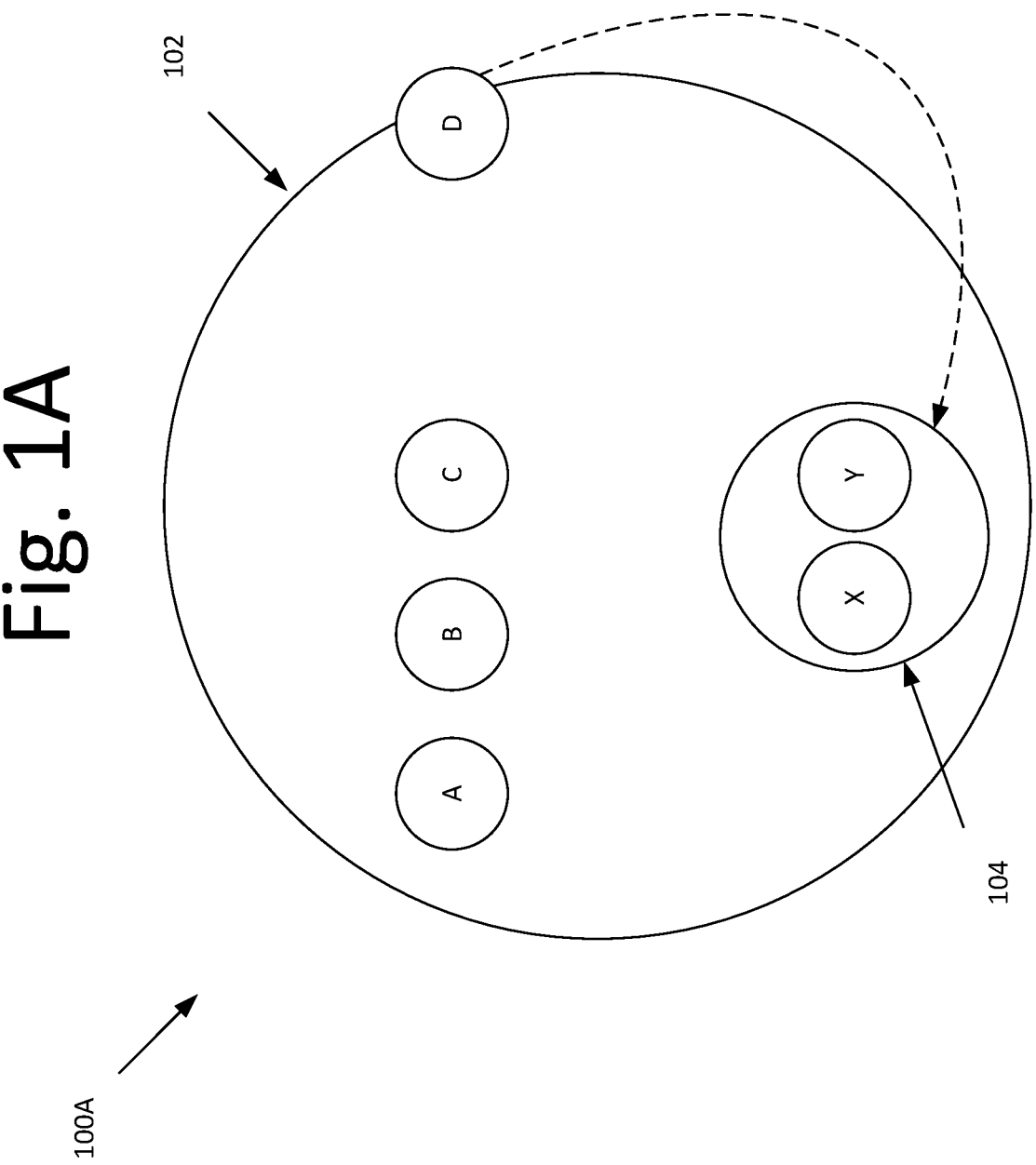
FIG. 1A is a set diagram illustrating a user entering a messaging channel, according to an embodiment of the present invention.

Some embodiments of the present invention generally pertain to creating a shadow channel (or in some embodiments a duplicate channel) for every messaging channel that exists for a given messaging broadcasting system. By creating a shadow channel for each messaging channel, users that are interested in receiving notifications may receive broadcasted notifications by way of the shadow channel. For example, the users subscribed to the shadow channel may receive the broadcasted notification at the time of the event, which cannot be stored or viewed later. For example, if a user is subscribed (or tuned into) the shadow channel at the time of the event, the user receives the broadcasted notification. Because the broadcasted notification is not stored or saved in some embodiments, the user may not receive the broadcasted notification when the user is not tuned into (or active on) the shadow channel. In some embodiments, one or more of the users may be subscribers to the shadow channel, but not to the messaging channel. This way, any user not part of, or not subscribed to, the shadow channel may not receive the notifications, which would otherwise be unwanted. Thus, receiving broadcasted messages are contingent upon the user being tuned into the shadow channel.

In some embodiments, every messaging channel may have features (or messaging filter modules) including, but not limited to, a presence feature, a geolocation feature, a time feature, a device type feature, and/or any other feature that may be appreciated by one of ordinary skill in the art without deviating from the scope of the invention. Features may be defined in some embodiments as rules or triggering conditions for a message to be broadcasted. The presence feature may track the presence of the users on a messaging channel. For example, the presence feature may track when a user enters or leaves the messaging channel.

There are two ways to track the presence of users in some embodiments. The first approach is to notify all users in the messaging channel, when a user arrives or leaves the messaging channel, for example. Another example may be a user looking at the product features' page. Each of these pages are within the domain of users (or agents) who handle different aspects of support for a product. Yet another example could be a user logging in from a specific geographic location. Further, a combination of some of these factors, such as pricing and geographic location, may be deemed as a separate event and lead to notifications. However, as explained above, the process of broadcasting a notification to everyone in a message channel may slow down the overall system due to the sheer number of notifications being transmitted, and may also notify uninterested users.

The second, and more efficient, approach is to create a shadow channel for the messaging channel and assign a presence feature to the shadow channel. For example, the shadow channel may broadcast a notification to the subscribed (or interested) users rather than unsubscribed (or uninterested) users when an event is triggered such as a user enters or leaves the messaging channel.

In some embodiments, events may be relayed to specific shadow channels based on rules. For example, a shadow channel may be language specific and all events in English could be directed to this shadow channel. Thus, when this event is triggered, users subscribed to this event are notified by way of a broadcast notification (or message) at the time of the event.

In certain embodiments, a geolocation feature may track when a user from a selected geographic region enters or leaves the messaging channel. A time feature may track at the selected time or the selected time interval (e.g., between 8:00 am and 12:00 pm) when a user leaves or enters the messaging channel. The device type feature may track when a selected device type, such as an iPhone™, enters or leaves the messaging channel. Simply put, each feature may act as a filter and may monitor or track for a predefined condition.

Apart from merely relaying events to the shadow channel, the notifications can also be filtered (picking one message, for instance), modified based on rules (creating new messages based on what's there, adding new message, deleting messages, combining messages) and transformed (modifying the same message) before the notification is broadcasted to the shadow channel.

Further, each shadow channel is assigned a feature. Since there may be one or more features, each messaging channel may have one or more shadow channels. This way, interested users may subscribe to the shadow channel(s) of his or her choice.

FIG. 1A is a set diagram 100A illustrating a user entering a messaging channel, according to an embodiment of the present invention. Typically, messaging channel 102 may include a large group of users, e.g., 'A', 'B', 'C', etc. This large group may be considered a superset. Within the superset, a subset of users may be interested in tracking the presence of users entering or leaving messaging channel 102. In this embodiment, subset 104, which is a smaller group within the larger group, includes one or more users.

In this example, users 'X' and 'Y' are part of subset 104, and may be subscribed users to the presence feature of the shadow channel. This way, when user 'D' enters messaging channel 102, the shadow channel associated with subset 104 may notify users 'X' and 'Y' regarding presence of user 'D'. The shadow channel may also notify users 'X' and 'Y' when user 'D' leaves messaging channel 102. Since users 'A', 'B', and 'C' are not subscribed to the shadow channel, or within subset 104, the shadow channel will filter out messages to users 'A', 'B', and 'C', meaning that users 'A', 'B', and 'C' will not receive the notification of the arrival of user 'D'.

Figure 1B:
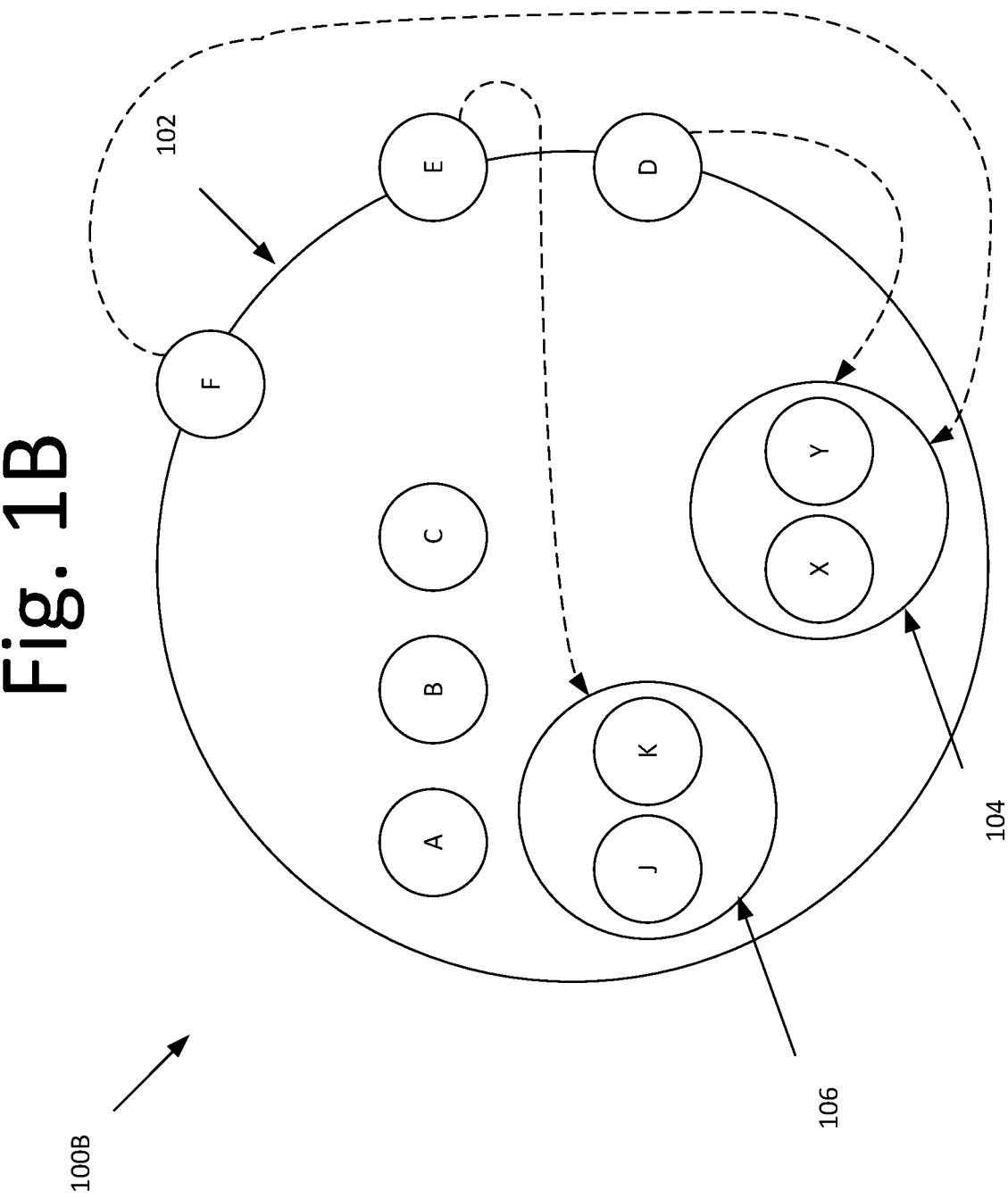
FIG. 1B is a set diagram illustrating a plurality of subsets within a larger superset (or messaging channel), according to an embodiment of the present invention.

As discussed above, a messaging channel may include more than one shadow channel, i.e., one shadow channel per feature. FIG. 1B is a set diagram 100B illustrating a plurality of subsets 104, 106 within a larger superset or messaging channel 102, according to an embodiment of the present invention. In this embodiment, messaging channel 102 may include two subsets 104, 106, each directed to a different shadow channel. For example, subset 104 may be track the presence of the users generally, and subset 106 may track the presence of users from a specific geographic region.

In this example, users 'X' and 'Y' are part of subset 104, and are subscribed to a shadow channel for tracking the presence of users in messaging channel 102. Also, in this example, users 'J' and 'K' are part of subset 106, and are subscribed to a shadow channel for tracking users from a predefined geolocation. For instance, the geolocation filter may track users from New York City or any predefined geographic region.

Assume that user 'E' is from New York City and user 'F' is from Los Angeles. When one or more users that are from New York City enter or leave messaging channel 102, users 'J' and 'K' may receive notification. For example, when user 'E' enters messaging channel 102, users 'J' and 'K' are notified by way of a broadcast notification that user 'E' from New York City joined messaging channel 102.

It should be noted, however, that users 'J' and 'K' would not receive notifications when other users, such as users 'D' and 'F', outside of the New York City geolocation enter or leave message channel 102. Only subscribers to the shadow channel are notified of user activity, whether that be entering or leaving messaging channel 102, or any other activity that would be appreciated by a person of ordinary skill in the art.

In some embodiments, subscribers of a shadow channel need not be part of the messaging channel. In other words, subscribers of a shadow channel may be part of a subset, but not part of the superset. FIG. 1C is a set diagram 100C illustrating a subset 108 outside of superset (or messaging channel) 102, according to an embodiment of the present invention. Users 'L' and 'M' are part of subset 108, which is associated with a shadow channel that tracks the presence of the users. In this example, when user 'F' joins messaging channel 102, shadow channel 108 may notify subscribers 'L' and 'M', who are not part of the larger superset of messaging channel 102, that user 'F' joined messaging channel 102.

In certain embodiments, a subset may include users that are part of the larger superset and other users that are not part of the superset. FIG. 1D is a set diagram 100D illustrating a subset 104 outside of the larger superset (or messaging channel) 102, according to an embodiment of the present invention. In this embodiment, users 'X', 'Y', and 'Z' are part of a subset (or shadow channel) 104 that tracks the activities of messaging channel 102.

In this embodiment, users 'X' and 'Y' may be part of messaging channel 102, and user 'Z' may not be part of messaging channel 102. Regardless, when user 'D' joins messaging channel 102, users 'X', 'Y', and 'Z' are notified of the presence of user 'D'. Thus, any user not part of subset 104 may not receive a notification of the activities within messaging channel 102.

In other words, the superset is the core (i.e., messaging channel) and the one or more subsets are the shadow channels. These shadow channels may be created on top of the messaging channel, and upon creation of the shadow channels, filters may be applied to each shadow channel. These filters may be used to track various conditions or events within a messaging channel, for example. These filters may also generate notifications when a specific condition is met, and the notifications may be routed by way of the shadow channel to all subscribers of the shadow channel.

Generally, users that are part of a messaging channel may trigger an event at any given time. When the event is triggered, one or more shadow channels may issue notifications to subscribed users. In some instances, however, an agent may not be part of the messaging channel, and may be subscribed to the shadow channel itself. In those instances, the agent that is not part of the messaging channel may receive notifications when the event is triggered. In this example, the agent, by him- or herself, will not trigger the event, but instead, will listen for notifications when other users that are part of the messaging channel trigger the event. Thus, some embodiments enable subscribers of the shadow channel to receive notifications even when the subscribers are not part of the messaging channel.

FIG. 2 is a flow diagram illustrating a process 200 for creating a shadow channel, according to an embodiment of the present invention. The process 200 begins at 202 with creating one or more shadow channels for a messaging channel. In embodiments that include multiple messaging channels, each messaging channel may include one or more shadow channels.

At 204, a filter is assigned to each shadow channels. These filters may include a presence filter, a geolocation filter, a device type filter, a time-based filter, and/or any other type of filter that would be appreciated by a person of ordinary skill in the art without deviating from the scope of the invention. Essentially, these filters may track the users of, or any activity within, the messaging channel. At 206, the shadow channels are published for the messaging channel. By publishing the shadow channels, users that are part of, or not part of, the messaging channel can subscribe to the shadow channel of interest. Users may also unsubscribe from, or re-subscribe to, one or more shadow channels at any time in some embodiments.

It should be appreciated that in some embodiments that shadow channels are implicit channels. For example, shadow channels may be provided as factory settings, and there may be a shadow channel for each type (e.g., notification shadow channel may be listed or identified as .notify). The list of implicit shadow channels may be exposed with an application programming interface (API) documentation. The need for listing shadow channel may arise when there are custom shadow channels that could take a rule from the user. Technically, when a specified event occurs, for presence a subscription request to a channel from the user, after handling the request, a new message is created with the defined parameters and is published onto the implicit shadow channel.

FIG. 3 is a flow diagram 300 illustrating a process for notifying users subscribed to a shadow channel, according to an embodiment of the present invention. The process begins at 302 with each shadow channel monitoring for a predefined activity within the messaging channel. For example, each shadow channel may monitor for a specific feature, e.g., presence, geolocation, device type, etc.

At 304, when an event or condition is triggered, a notification is sent to the subscribers (or registered user devices) of the shadow channel. For example, assume that the shadow channel is monitoring for an activity by a device type. When activity by a device of the selected type (or types) occurs, the condition is triggered and a notification is broadcasted to the subscribers of the shadow channel. This way, only interested users receive the notification, reducing the number of notifications generated.

FIG. 4 is a diagram illustrating a system architecture 400 for a shadow channel, according to an embodiment of the present invention. In some embodiments, system architecture may include a client 402, a HUB 404, and a PUB/SUB 406. In certain embodiment, hub may include one or more HTTP servers 408, 410. These HTTP servers 408, 410 may act as the front-end servers to which all clients 402 are connected. PUB/SUB 406 may include one or more servers 412, 414, and may be a component of the RTS, which receives and routes messages to HUB 404, which will further forward the messages to clients 402. Load balancer (LB) 416 may be connected between a client 402 and HUB 404, and may distribute the load among various machines (e.g., clients and servers).

In an embodiment, client 402 may transmit a subscription request to a server 412. In this embodiment, LB 416 may forward the subscription request to HTTP server 408, and onto server 412. Server 412 returns a subscription reply to HTTP server 408. HTTP server 408 may then send the response to client 402.

In another embodiment, when the presence feature is triggered, HTTP server 408 may generate a presence notification and send the presence notification to server 412. Server 412 may publish the presence notification to HTTP server 410. HTTP server 410 may then send the published presence notification to all subscribers of the shadow channel, e.g., to client 402.

The process shown in FIGS. 2 and 3 may be performed, in part, by a computer program, encoding instructions for a nonlinear adaptive processor to cause at least the process described in FIGS. 2 and 3 to be performed by the computing systems discussed herein. The computer program may be embodied on a non-transitory computer readable medium. The computer readable medium may be, but is not limited to, a hard disk drive, a flash device, random access memory (RAM), a tape, or any other such medium used to store data. The computer program may include encoded instructions for controlling the nonlinear adaptive processor to implement the process described in FIGS. 2 and 3, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for notifying a subset of users of a messaging channel, comprising:
   publishing one or more shadow channels for the messaging channel, wherein the messaging channel is part of a message broadcasting system, and each of the one or more shadow channels is a duplicate of the messaging channel notifying one or more subscribed user devices to the one or more shadow channels and filtering transmission of an event notification to one or more non-subscribed user devices; and
   broadcasting one or more event notifications to one or more subscribed user devices when an event associated with the one or more shadow channels is triggered, wherein
   the one or more subscribed user devices are subscribers to the one or more shadow channels.

2. The method of claim 1, wherein each of the one or more shadow channels is assigned a predefined activity for monitoring purposes, the predefined activity comprising user activity, device type activity, geolocation activity, and/or predefined time activity.

3. The method of claim 2, further comprising:
   monitoring for the predefined activity within the messaging channel.

4. The method of claim 1, wherein the one or more event notifications are broadcasted via the one or more shadow channels, eliminating transmission to non-subscribed user devices.

5. The method of claim 1, wherein the one or more subscribed user devices are subscribed to the one or more shadow channels and are part of the messaging channel.

6. The method of claim 1, wherein the one or more subscribed user devices are subscribed to the one or more shadow channels and are outside of the messaging channel.

7. The method of claim 1, wherein each of the one or more shadow channels are a subset within the messaging channel for the purposes of eliminating the event notifications to non-subscribed user devices.

8. A computer program embodied on a non-transitory computer-readable medium, the computer program when executed by at least one processor causes an apparatus to:
   publish one or more shadow channels for the messaging channel, wherein the messaging channel is part of a message broadcasting system, and each of the one or more shadow channels is a duplicate of the messaging channel notifying one or more subscribed user devices to the one or more shadow channels and filtering transmission of an event notification to one or more non-subscribed user devices; and
   broadcast one or more event notifications to one or more subscribed user devices when an event associated with the one or more shadow channels is triggered, wherein the one or subscribed user devices are subscribers to the one or more shadow channels.

9. The computer program of claim 8, wherein each of the one or more shadow channels is assigned a predefined activity for monitoring purposes, the predefined activity comprising user activity, device type activity, geolocation activity, and/or predefined time activity.

10. The computer program of claim 9, wherein the computer program when executed by at least one processor causes the apparatus to monitor for the predefined activity within the messaging channel.

11. The computer program of claim 8, wherein the one or more event notifications are broadcasted via the one or more shadow channels, eliminating transmission to non-subscribed user devices.

12. The computer program of claim 8, wherein the one or more subscribed user devices are subscribed to the one or more shadow channels and are part of the messaging channel.

13. The computer program of claim 8, wherein the one or more subscribed user devices are subscribed to the one or more shadow channels and are outside of the messaging channel.

14. The computer program of claim 8, wherein each of the one or more shadow channels are a subset within the messaging channel for the purposes of eliminating the event notifications to non-subscribed user devices.

15. A system for broadcasting event notifications to interested users, comprising:
   at least one server; and
   a plurality of subscribed user devices, wherein
   the at least one server is configured to establish a messaging channel comprising a plurality of shadow channels,
   the messaging channel is part of a message broadcasting system, and each of the plurality of shadow channels is a duplicate of the messaging channel,
   each of the plurality of shadow channels correspond to a predefined activity within the messaging channel, and
   when the predefined activity occurs within one of the plurality of shadow channels, the at least one server, via one of the plurality of shadow channels, is configured to broadcast an event notification to one or more of the subscribed user devices, filtering event notification transmission to non-subscribed user devices that are not part of the shadow channel.

16. The system of claim 15, wherein each of the plurality of shadow channels are assigned a predefined activity for monitoring purposes, the predefined activity comprising user activity, device type activity, geolocation activity, and/or predefined time activity.

* * * * *